July 7, 1925.
H. R. REYNOLDS
HANGER BOX
Original Filed April 3, 1923
1,544,682
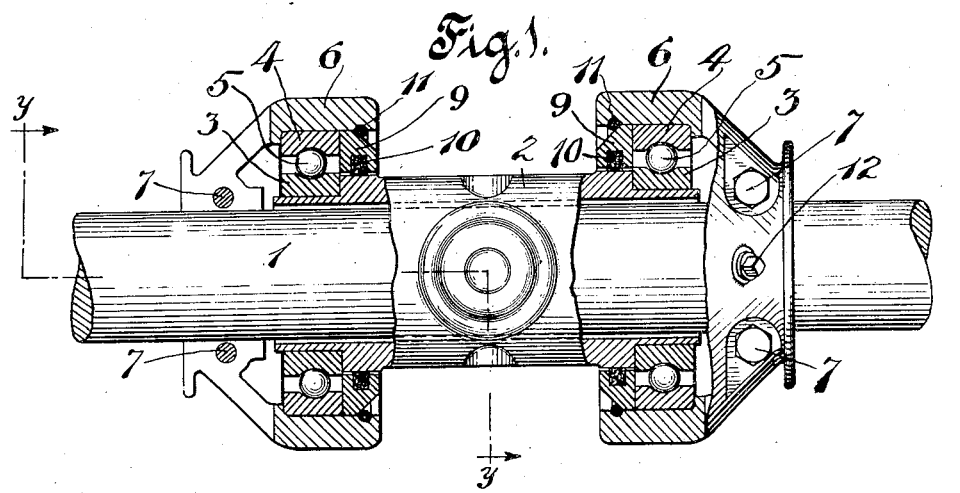
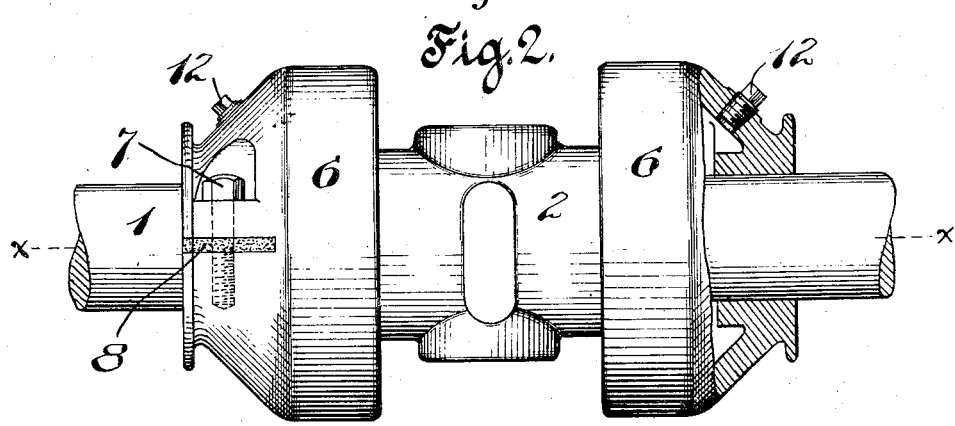
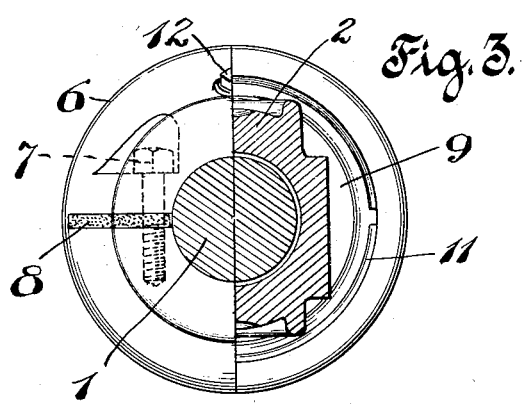
INVENTOR
Harry R. Reynolds
BY
ATTORNEYS.

Patented July 7, 1925.

1,544,682

UNITED STATES PATENT OFFICE.

HARRY R. REYNOLDS, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

HANGER BOX.

Application filed April 3, 1923, Serial No. 629,657. Renewed January 28, 1925.

*To all whom it may concern:*

Be it known that I, HARRY R. REYNOLDS, a citizen of the United States of America, residing at New Britain, Connecticut, have invented a new and useful Hanger Box, of which the following is a specification.

My invention relates to certain new and useful improvements in anti-friction bearings, which improvements are of particular advantage when used in connection with so called hanger boxes for shafting. Heretofore the standard application of an anti-friction hanger box bearing to straight shafting has been accomplished by affixing the inner bearing ring or rings of an anti-friction means to the shafting, so that said parts will rotate together. In such constructions there is the tendency of the parts to loosen up, which is difficult to overcome and which, when it occurs, soon develops lost motion and inaccuracy of operation. When looseness occurs in such constructions the parts can not be tightened up without much effort. My present invention aims to overcome these objections and to that end I provide a construction in which the inner bearing ring or rings are free of the shafting, the same being part of a central, sleeve-like unit that does not engage the shaft to be supported, but which turns freely thereof.

The outer rings of the anti-friction bearing are provided with simple and effective means for firmly securing the same to the shaft to be supported, in a manner which substantially eliminates the possibility of wear, and which, if looseness should occur, may be quickly retightened with the greatest ease. These devices are also so constructed as to constitute cups or housings containing and protecting the anti-friction means, and permitting the easy and effective lubrication thereof.

While the invention is especially suitable for supporting line shafting, it is also adapted to mounting loose pulleys and other rotatable machine units.

The above, and many other, advantages will be apparent to the mechanic skilled in this art from a reading of the following specification and an examination of the accompanying drawings, in which—

Fig. 1 is a side elevation, largely in section, of my invention as adapted for what is termed a shaft hanger, the parts in section being shown on the plane of the line $x-x$ of Fig. 2.

Fig. 2 is a side elevation, taken in a plane at right angles to that shown in Fig. 1, said view being partly in section.

Fig. 3 is an end elevation, partly in section, on the line $y-y$ of Fig. 1.

1 represents a line shafting with the ends broken away. 2 represents a sleeve, the bore of which is larger than the diameter of the shaft 1. Upon the ends of the sleeve 2 are mounted the inner rings 3—3 of two anti-friction bearings. 4—4 represent the outer rings of said bearings, respectively, and 5—5 represent the anti-friction devices for said bearings.

Each outer ring 4 is snugly seated and held in a housing 6, one end of which housing is contracted so that it will approximately fit on the shaft 1. This end is preferably split longitudinally to form, in effect, two jaws which may be drawn toward each other or pinched upon the shaft 1 by means of clamping bolts 7—7. 8 represents a packing of felt or the like, which may fill the slitted end of the housing 6, so as to exclude dust or dirt. At the other end of each housing 6 is provided suitable means for preventing dust or dirt from entering at that end. In the particular form shown this dust-protecting device comprises a ring 9 and a felt packing 10, which later bears lightly on the central sleeve 2. The ring 9 may be held in place by a split spring ring 11, which may be snapped into an annular groove on the inner wall of the housing 6. 12 is a plug, which may be provided in each housing and which, when removed, permits oil, grease or any suitable lubricant to be introduced within the housing for the benefit of the anti-friction bearing therein.

It will at once be seen that, by the arrangement described, the central sleeve 2 is entirely free of the shafting 1, the entire device being connected thereto by means of the housing supports for the outer bearing rings 4—4. The particular manner of connecting these supporting housings to the shaft may be varied in many ways, but the form that I have shown herein is easily accessible at all times, and is exceedingly simple, inexpensive and effective, and avoids the use of keys, wedges or other such devices as have heretofore been employed in devices of this kind of the old type. In the particular design of the apparatus herein shown, the central member or sleeve 2 is the part that is engaged by the usual hanger or support (not shown). No claim is made to the particular form of support or hanger, since such devices are well known in the art of shaft hangers.

Obviously, if the construction is to be used for the purposes of a loose pulley or other rotatable machine unit, the loose pulley or other rotatable machine unit would be mounted upon the central rotatable sleeve 2. This suggestion is offered for the purpose of making it clear that the construction is not necessarily limited in its use to shaft hanger boxes, although, for reasons heretofore assigned, it possesses very great utility in that particular connection, and constitutes a substantial departure and radical improvement over the standard type hanger box bearings now in use.

It will be noted that the contracted end of each housing 6 forms, in effect, a hub of sufficient length to grip the shafting 1 in such a manner as to furnish a firm support for each housing. It will also be noted that, when a hub end is slitted to form two clamping jaws, it is preferable to use two clamping screws 7—7 for each hub, one on each side of the shafting, as best seen in Fig. 1.

What I claim is:

1. An anti-friction device for a rotatable shaft, comprising, a sleeve element having a bore of a size to freely receive said shaft, an anti-friction bearing mounted on the outside of said sleeve and including an inner ring and an outer ring larger than the inner ring and concentric therewith and having anti-friction members between said rings, said inner ring being adapted to be secured to said sleeve and means for securing said outer ring to the shaft.

2. An anti-friction device for a rotatable shaft, comprising, a sleeve element having a bore of a size to freely receive said shaft, anti-friction bearings mounted on the outside of said sleeve and each including an outside ring, and means for securing each outside ring to said shaft, said securing means comprising clamping jaws.

3. An anti-friction device for a rotatable shaft, comprising, a sleeve element having a bore of a size to freely receive said shaft, anti-friction bearings mounted on the outside of said sleeve and each including an outside ring, and means for securing each outside ring to said shaft, said securing means comprising clamping jaws and clamping screws for said jaws.

4. An anti-friction device for a rotatable shaft, comprising, a sleeve element having a bore of a size to freely receive said shaft, anti-friction bearings mounted on the outside of said sleeve and each including an outside ring, and means for securing each outside ring to said shaft, said securing means forming a protective housing for said anti-friction bearings.

5. An anti-friction device for a rotatable shaft, comprising, a sleeve element having a bore of a size to freely receive said shaft, anti-friction bearings mounted on the outside of said sleeve and each including an outside ring, and means for securing each outside ring to said shaft, said securing means forming a protective housing for said anti-friction bearings, said housing having an opening for the admission of lubricant for said enclosed bearings.

6. An anti-friction hanger box for shafting, comprising, a sleeve of a size to loosely surround said shafting, two bearing rings mounted apart on said sleeve, two complementary bearing rings surrounding the first mentioned rings, with anti-friction devices therebetween, separate housings surrounding said bearings, the outer end of each housing extending beyond the adjacent end of said sleeve and adapted to be secured to said shafting, whereby said housings and outer rings will turn with the shafting and whereby said shafting will turn freely of said sleeeve.

7. An anti-friction hanger box for shafting, comprising, a sleeve of a size to loosely surround said shafting, two bearing rings mounted apart on said sleeve, two complementary bearing rings surrounding the first mentioned rings, with anti-friction devices therebetween, separate housings surrounding said bearings, the outer end of each housing extending beyond the adjacent end of said sleeve and adapted to be secured to said shafting, whereby said housings and outer rings will turn with the shafting and whereby said shafting will turn freely of said sleeve, with means for guarding against the intrusion of injurious matter into the bearing space within said housings.

8. An anti-friction hanger box for shafting, comprising, a sleeve of a size to loosely surround said shafting, two bearing rings mounted apart on said sleeve, two complementary bearing rings surrounding the first mentioned rings, with anti-friction devices therebetween, separate housings surrounding said bearings, the outer end of each housing extending beyond the adjacent end of said sleeve and adapted to be secured to said shafting, whereby said housings and outer rings will turn with the shafting and whereby said shafting will turn freely of said sleeve, said housing ends being contracted to fit the shafting and each carrying a clamping screw to lock the same on said shafting against independent rotation.

9. An anti-friction hanger box for shafting, comprising, a sleeve of a size to loosely surround said shafting, two bearing rings mounted apart on said sleeve, two complementary bearing rings surrounding the first mentioned rings, with anti-friction devices therebetween separate housings surrounding said bearings, the outer end of each housing extending beyond the adjacent end of said sleeve and adapted to be secured to said shafting, whereby said housings and outer rings will turn with the shafting and whereby said shafting will turn freely of said sleeve, said housing ends being contracted to fit said shafting, and slitted to form clamping jaws, and screws for said jaws.

10. A hanger box for shafting, including a sleeve adapted to freely surround the shafting, housing means at least partially surrounding said sleeve, said housing means being adapted to be secured to said shafting, and antifriction members between radially aligned raceways on said housing means and said sleeve, whereby said housing means will rotate with said shaft and said sleeve will be supported by said anti-friction members.

11. A hanger box for shafting, including a sleeve adapted to freely surround the shafting, spaced anti-friction member raceways on said sleeve, housing means adapted to be secured to said shafting, said housing means having spaced anti-friction member raceways outside of and surrounding said raceways on said sleeve, anti-friction members interposed between said inner and outer raceways, whereby said housing means will rotate with the shaft and said anti-friction members will support said sleeve free of said shaft.

12. In a hanger box for a shaft, an inner member free of the shaft, housing means adapted to be secured to the shaft to rotate therewith, spaced anti-friction member raceways on said inner member, corresponding anti-friction member raceways on said housing means, and surrounding the raceways on said inner member, and anti-friction members in said raceways for supporting said housing from said inner member, the latter being free of the shafting.

13. A hanger box for shafting, comprising a sleeve adapted to freely surround said shafting, supporting means at the opposite ends of said sleeve for supporting the latter on, but free of said shafting, anti-friction devices between said sleeve and said sleeve-supporting means, both of said supporting means forming a housing surrounding and protecting said anti-friction devices, and a clamping hub on each housing for directly engaging said shafting and for locking the same thereon.

HARRY R. REYNOLDS.